United States Patent [19]
Carlton

[11] Patent Number: 5,975,425
[45] Date of Patent: Nov. 2, 1999

[54] TECHNIQUE TO REDUCE CHEMICAL USAGE AND CONCOMITANT DRIFT FROM AERIAL SPRAYS

[75] Inventor: James B. Carlton, Port O'Connor, Tex.

[73] Assignee: The United States of America as represented by the Secretary of Agriculture, Washington, D.C.

[21] Appl. No.: 08/909,310

[22] Filed: Aug. 14, 1997

[51] Int. Cl.$^6$ .................................................. A01G 23/10
[52] U.S. Cl. .......................... 239/3; 239/171; 239/704; 244/136
[58] Field of Search ............................. 239/3, 159, 171, 239/244, 690.1, 697, 704, 708; 244/136

[56] References Cited

U.S. PATENT DOCUMENTS

| | | | |
|---|---|---|---|
| 4,328,940 | 5/1982 | Malcolm | 244/136 |
| 4,509,694 | 4/1985 | Inculet et al. | 239/697 |
| 4,560,107 | 12/1985 | Inculet | 239/697 |
| 4,703,891 | 11/1987 | Jackson et al. | 239/171 |
| 4,762,274 | 8/1988 | Burls et al. | 239/3 |
| 5,042,723 | 8/1991 | Grocott et al. | 239/704 |

OTHER PUBLICATIONS

Carlton, J.B., et al., Electrostatic Charging of Aerial Spray Over Cotton, *Transactions of the ASAE*, 1995 American Society of Agricultural Engineers, vol. 38(6), 1641–1645.
Carlton, J.B., Techniques in Electrostatic Charging of Sprays from Aircraft, Proc. 17th Ann. Tex. Agri. Avia. Conf. And Short Course on Pest Control, Texas A&M Univ., College Station, TX, Feb. 25–27, 1968, pp. G–1–G–19.

*Primary Examiner*—Andres Kashnikow
*Assistant Examiner*—Dinh Q. Nguyen
*Attorney, Agent, or Firm*—M. Howard Silverstein; Randall E. Deck; John D. Fado

[57] ABSTRACT

An apparatus and method are disclosed for the aerial spraying of agricultural chemicals with improved spray deposition and reduced drift. The spraying apparatus includes two oppositely charged sets of spray nozzles which may be fitted onto an aircraft. Both sets include one or more nozzles having spraying tips which produce a hollow cone spray pattern, and at least the tips of these nozzles are constructed of a substantially non-conducting material. Cylindrical electrodes are positioned concentric to the nozzle tips for inducing an electrostatic charge upon liquid spray emitted from the nozzles. The electrodes are in turn connected to high voltage power supplies, with the electrodes corresponding to the first nozzle set being connected to a power supply of opposite potential than the electrodes corresponding the second nozzle set. Consequently, the spray issuing from the nozzle sets will be oppositely charged. For effective electrostatic aerial spraying from an aircraft, the corona discharge of the airframe must be substantially near zero. In practice, this is accomplished by maintaining equal mass flow rates of the fluid dispensed from each nozzle set, and adjusting the charging voltage of the each power supply such that the fluids provided to each nozzle set have equal charge to mass ratios which are at a level of at least 0.8 mC/kg.

12 Claims, 8 Drawing Sheets

TECHNIQUE TO REDUCE CHEMICAL USAGE AND CONCOMITANT DRIFT FROM AERIAL SPRAYS

BACKGROUND OF THE INVENTION

1. Field of the Invention

The invention relates to a method and apparatus for aerial spraying of agricultural chemicals.

2. Description of the Prior Art

Several United States patents exist that are known to have relevance to aerial electrostatic spraying (i.e., U.S. Pat. Nos.: 4,004,733; 4,328,940; 4,703,891; 4,560,107; and 5,042,723). It is an experimental fact that electrostatically charged sprays do not show depositional enhancement upon crops until the associated spray charge-to-mass ratio exceeds 0.8 millicoulomb/kilogram, symbolically: (Q/M≧0.8 mC/kg) (Law and Lane, 1981, ibid). Accordingly, if this ratio is elevated to Q/M=1.0 mC/kg, then there would be an expected depositional advantage of 1.0/0.8=1.25 or 25% by using the higher (Q/M=1.0) charge level. However, aerial sprays labeled for agricultural use are not directly chargeable with conventional nozzles. Specifically, there are currently no known commercial or patented nozzles capable of meeting the requirements of a practical, aerial, electrostatic spray-charging nozzle.

Research has shown however that if these foregoing problems can be overcome, biological efficacy can be obtained with less aerial sprayed chemicals than are currently used. Some examples of recent research document this Carlton et al. (1995b, Cotton pesticide deposition from aerial electrostatic charged sprays, ASAE Paper No. AA95-007, ASAE, St. Joseph, Mich.) showed that an aerial spray charging level of Q/M=±1.15 mC/kg significantly increased deposition on cotton over that of one where Q/M=±0.80 mC/kg. Latheef et al. (1995, Aerial electrostatic charged sprays for control of sweetpotato whitefly in cotton, ASAE Paper No. AA95-008, ASAE, St. Joseph, Mich.) showed that whiteflies were controlled significantly better using a charged spray (Q/M=±1.15 mC/kg) than the conventional sprayed cotton. The charged spray achieved this result using ⅒ the volume of water carrier as the conventional aerial spray while both sprays contained the same amount of active ingredient. Carlton et al. (1995a, ibid) also has shown that a bipolar charged spray of Q/M=±2.64 mC/kg resulted in a deposition on cotton that was 4.3 times greater than the uncharged counterpart. These data show that by properly controlling the spray charging process, deposition can be enhanced while resulting in efficacy.

SUMMARY OF THE INVENTION

I have now invented a novel apparatus and method for the aerial spraying of agricultural chemicals with improved spray deposition and reduced drift. The spraying apparatus includes two oppositely charged sets of spray nozzles. Both sets include one or more nozzles having spraying tips which produce a hollow cone spray pattern, and at least the tips of these nozzles are constructed of a substantially non-conducting material. Cylindrical electrodes are positioned concentric to the nozzle tips for inducing an electrostatic charge upon liquid spray emitted from the nozzles. The electrodes are in turn connected to high voltage power supplies. However, the electrodes corresponding to the first nozzle set are connected to a power supply of opposite potential than the electrodes corresponding the second nozzle set such that the spray issuing from the nozzle sets will be oppositely charged. Aircraft fitted with the spraying apparatus may be used for spraying a variety of liquid formulations of agricultural chemicals. For effective electrostatic aerial spraying from an aircraft, the corona discharge of the airframe must be substantially near zero. In practice, this is accomplished by maintaining equal mass flow rates of the fluid dispensed from each nozzle set, and adjusting the charging voltage of each power supply such that the fluids provided to each nozzle set have equal charge to mass ratios at a level of at least 0.8 mC/kg.

In accordance with this invention, it is an object to provide an apparatus and method for aerial spraying of agricultural chemicals with improved spray deposition than previously attainable, achieving biological efficacy with reduced spray volumes and chemical use.

It is another object of this invention to provide an apparatus and method for aerial spraying of agricultural chemicals with reduced drift.

Other objects and advantages of this invention will become readily apparent from the ensuing description.

DETAILED DESCRIPTION OF THE INVENTION

The process and apparatus of this invention may be used for the aerial application of agricultural chemicals to a variety of plants, particularly agronomically important field crops, ornamentals, orchards, and forests, as well as urban or aquatic areas. Examples of agricultural chemicals which may be applied include but are not limited to liquid formulations of pesticides, herbicides, insecticides, fungicides, and fertilizers.

Figure 1:
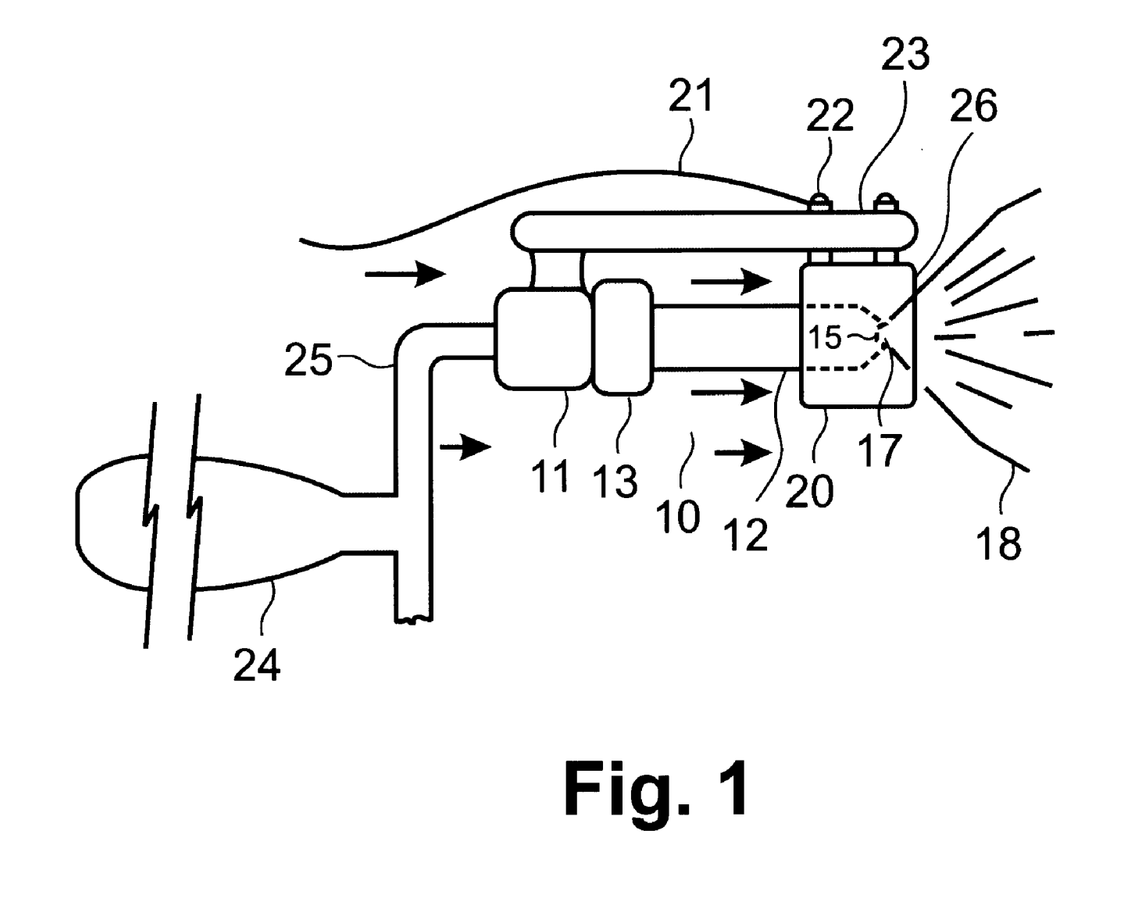
FIG. 1 is a side view of the aerial spray charging nozzle of this invention.
Figure 2:
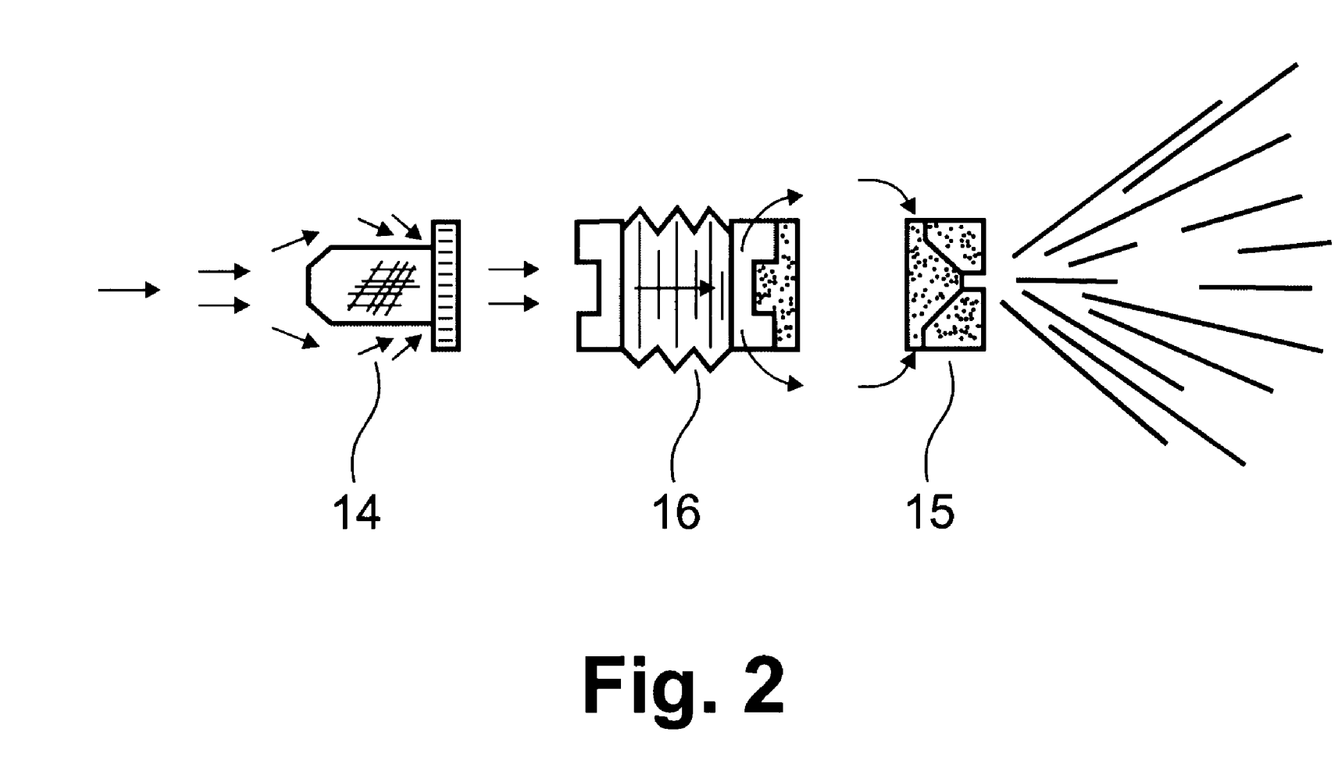
FIG. 2 is a side view of the separated internal spray nozzle components and the liquid routing path through the aerial spray charging nozzle of FIG. 1.

The apparatus includes two substantially identical sets of nozzles which are adapted to be oppositely charged. Referring to FIG. 1, each nozzle set includes one or more nozzles 10 having a body 11 and tip section 12 joined by annular cap 13. A conventional screened filter check valve 14 (FIG. 2) is positioned within the interior of valve body 11, while a valve orifice 15 and a retainer 16 for the orifice are provided within nozzle tip section 12 adjacent the outlet 17 thereof.

The spray pattern of the nozzle 10 and its material of construction are critical for effective electrostatic charging of the sprayed material in accordance with this invention. Nozzle tip 12, and thus orifice 15 and retainer 16, are selected to provide a hollow cone spray pattern or plume 18 of the liquid from the outlet 17. The interior angle of the hollow cone, measured at the outlet 17, should be sufficient to provide shearing and atomization of the spray by the high velocity air (created by the forward aircraft movement, and indicated by arrows in FIG. 1) flowing around and past the nozzle. This cone angle is variable with the viscosity or formulation of the material being sprayed and the air velocity, but is generally between about 60 to 90°, with a range between about 70 to 80° being preferred. Smaller angles may result in insufficient atomization of the spray, while larger angles may result in direct contact of the liquid spray with electrode 20. In addition, at least the tip 12 of the nozzle, including orifice 15 and retainer 16, must be constructed of a substantially non-conductive (electrically insulating) material, such as a plastic or ceramic material, to prevent electrically shielding the interior conductive liquid through the nozzle. The size of the nozzle 10 is not critical, although in the preferred embodiment the nozzle tip 12 is elongated in comparison to conventional aerial spray nozzles, generally being between about 1.5 to 2 inches long.

A variety of known non-conductive hollow cone nozzles and their components are suitable for use herein. In accordance with the preferred embodiment, without being limited thereto, the orifice 15 and retainer 16 are from the TX-VK8 nozzle tip of Spraying Systems Co. (Wheaton, Ill.). Nozzle tip 12 is similar in construction to conventional nozzle tips but longer, being constructed from a 1.75 in. delrin rod machined for housing the selected orifice and retainer.

The first and second nozzle sets are adapted to induce electrostatic charges which are of opposite polarity on the fluid sprayed from the nozzles of each set. Thus, fluid sprayed from the first nozzle set will be oppositely charged from fluid sprayed from the second nozzle set. To impose a high voltage induced charging field on the sprayed fluid, an electrode 20 is provided adjacent to the tip 12 of each nozzle 10. Each electrode which is coupled with a nozzle of the first nozzle set is connected to a first high voltage power supply, while the electrodes coupled with the nozzles of the second nozzle set are connected to a second high voltage power supply of the opposite polarity than the first power supply. These high voltage power supplies are described in greater detail hereinbelow. The charging voltage is supplied to the electrodes from the power supplies by conductive wires 21 connected at pin or screw 22.

The shape and positioning of the electrodes are also critical. Electrodes 20 are cylindrical in shape and are located concentric or coaxial to the nozzle tip 12 a distance effective to induce an electrostatic charge upon the sprayed fluid. Moreover, electrodes 20 should be positioned surrounding the outlet 17 and/or at least a portion of the spray cone 18 so as to impose an electric field upon the spray, but out of contact with the trajectory of the spray cone 18. In addition, the radial distance between the outer surface of the tip 12 and the inner surface of the electrode should be sufficient to allow laminar air flow through the electrode. The optimum axial position and distances selected will vary with the spray formulation and its physical properties, air velocity, flow rate, nozzle tip, and charging voltage, and may be readily determined as described hereinbelow. However, without being limited thereto, in the preferred embodiment the axial distance between the trailing or downwind end 26 of the electrode and the external, exposed surface of orifice 15 (the distance from the surface of the orifice to the trailing end of the electrode measured along the common axis of the nozzle and electrode) should be between about 0.25 to about 0.6 inches.

The material of construction of the electrode is not critical, and a variety of electrically conducting materials may be used, with stainless steel being preferred. Electrodes 20 are retained in the above-described position and insulated from the nozzle 10 by support arm 23 which is constructed from a substantially non-conductive material.

Placement of the nozzle sets onto an aircraft and supply of fluid material to the nozzles are provided by use of hollow booms 24. Generally, at least one boom is provided on each side of the aircraft, preferably on the underside of the wings. Nozzles 10 are mounted along the length of each boom 24, with the longitudinal axis of the nozzle tips 12 parallel to the laminar air flow stream (FIG. 1). Fluid material for spraying is delivered to the nozzles from a reservoir through boom 24 and conduit 25. Booms 24 and conduits 25 also provide the electrical ground connection to each nozzle, that is, through the aircraft frame extending up to the conduit 25. The nozzles 10 may be distributed on the booms 24 singly or in groups. However, for practical considerations, the nozzles are positioned in pairs as most clearly shown in FIG. 6.

It should be noted that this positioning of the nozzles 10 on booms 24 is a separate issue from, and is contrasted with the arrangement of the two oppositely charged nozzle sets on the aircraft. The actual arrangement of the first and second nozzle sets on the booms is described in greater detail hereinbelow.

Figure 3:
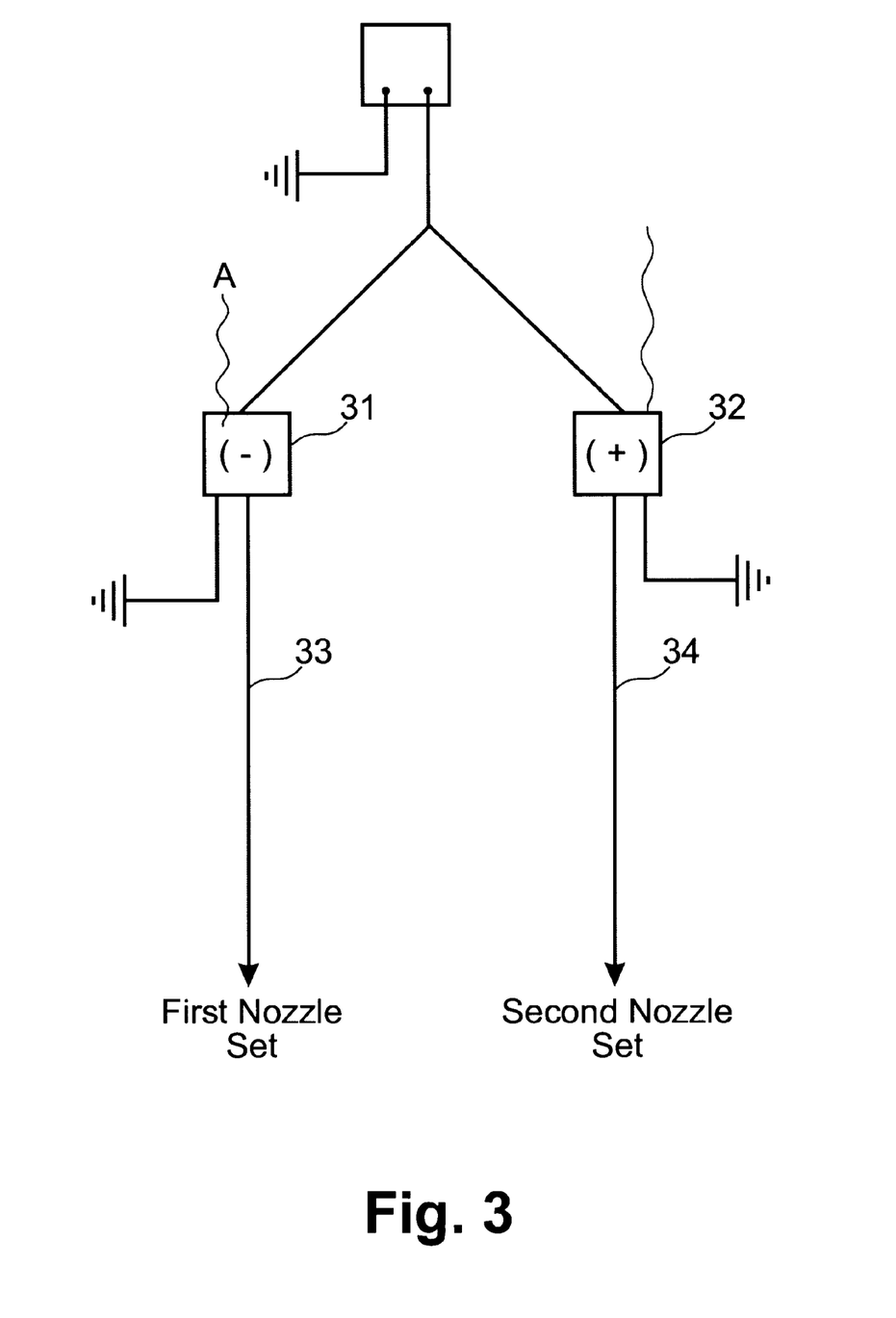
FIG. 3 is a schematic drawing of the electrical spray charging system components of the invention.

The spray charging system for supplying voltage to the system is similar to conventional bipolar spray charging systems. Two independent, high voltage dc power supplies 31 and 32, preferably between about 5 to 20 kV and most preferably about 10 kV, 1 ma, are used to generate both positive (+) and negative (−), or (±) charged spray polarities. A typical charging system suitable for use with an aircraft is shown in FIG. 3. The two matched power supplies 31 and 32 are appropriately mounted in the aircraft and connect directly to the 28 vdc aircraft battery 30. Controls should be provided in the cockpit for independent operation and adjustment of output voltage from each power supply. High voltage insulated distribution cables 33 and 34 connect the electrodes of each nozzle set to a terminal of one of the power supplies. Cable 33 supplies a charge of (−) polarity to the electrodes of one of the nozzle sets, while cable 34 supplies a charge of (+) polarity to the electrodes of the other nozzle set. Thus, the potential of all of the electrodes of the first nozzle set will be of the opposite polarity than the potential of the electrodes of the second nozzle set. The remaining terminals of both power supplies are grounded to the aircraft frame as shown. The base of each nozzle is also independently, electrically grounded through the booms 24 (or the common airframe) then to the grounded high voltage power supply terminal.

By way of example, in accordance with the preferred embodiment, one of the cables 33 or 34 is routed and connects to the inboard end of a high voltage buss or distribution bar (not shown). The buss bar may be a 0.25 inch diameter stainless steel tubing mounted on insulators along the spray booms 24. The buss is positioned parallel to and out from the trailing edge of the booms. Short lengths of wire 21 such as 6–8 in. of 80 lb. stranded, stainless steel nylon coated wire (fishing line hardware) connect the buss bar to each nozzle electrode of the first nozzle set. This arrangement permits a high, (+) or (−) polarity, variable voltage to be placed upon all the electrodes of that particular nozzle set. The other power supply and second nozzle set are similarly electrically connected except for use of the opposite high voltage polarity.

It is generally recognized that to prevent the aircraft frame from building up an electric potential during operation, the airframe corona discharge must be maintained at substantially zero. Thus, for proper operation of this spray charging system, the first nozzle set spray charge-to-mass ratio should be identical to that of the second nozzle set. That is, (+)Q/M=(−)Q/M.

Assuming identical numbers and types of nozzles and equal spray mass flow rates from each nozzle set, there should also be corresponding equal amounts of charge similarly flowing, but of opposite polarity. To this end, a monitoring circuit is preferably provided for the pilot to measure airframe corona emission, as well as pressure gauges and system flow meters to help insure that the total spray flow from each nozzle set is essentially equal.

Figure 4:
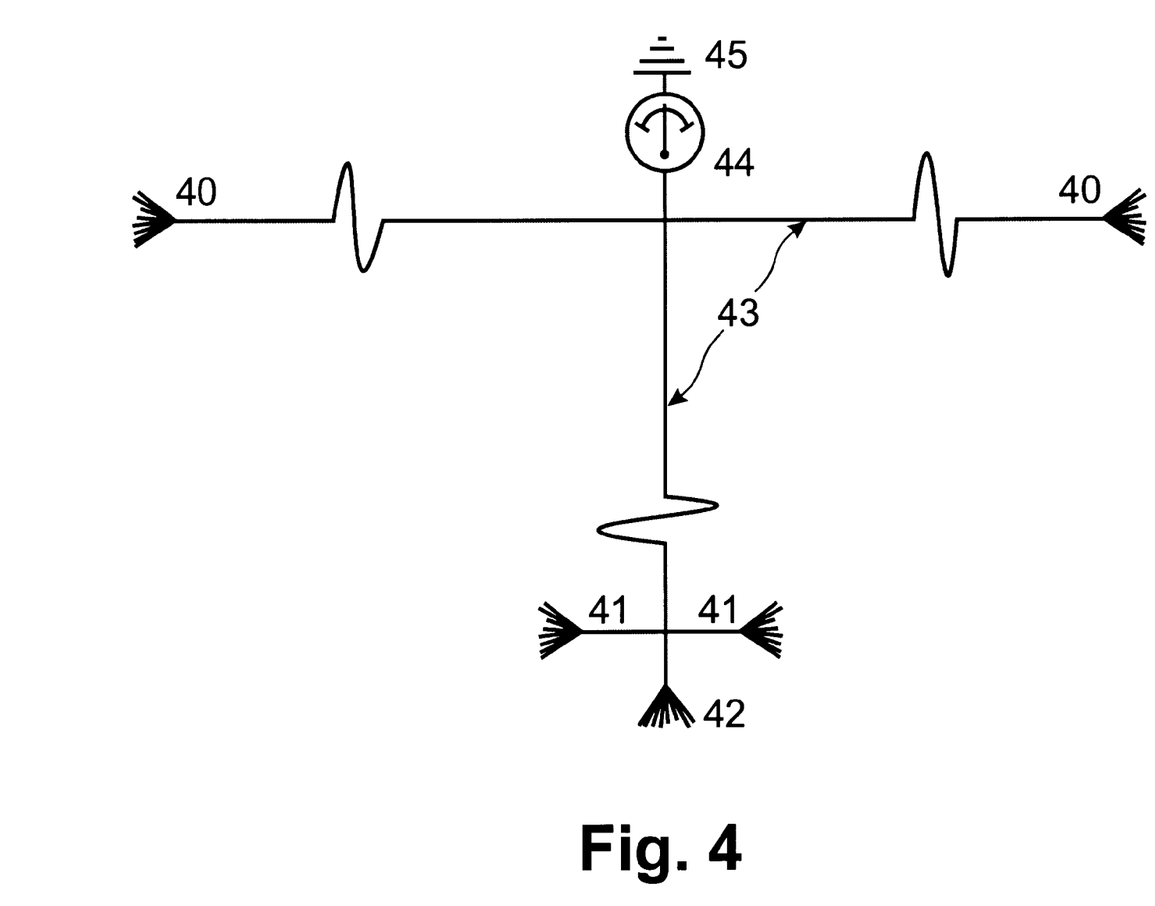
FIG. 4 shows the electrical circuit/components for monitoring aircraft corona discharge.

An example of a suitable circuit for guiding the pilot to establish and maintain quality control of the charging process is given in FIG. 4. The figure shows the location of five whip type, commercial aircraft corona discharge antennas. Specifically, two dischargers 40 are mounted on insulators at the outer ends of the main wingtips. Similarly, the dischargers 41 are positioned at the tips of the horizontal stabilizer, and that of 42 is located atop the vertical stabilizer. Wire 43 is typically 22 ga stranded copper with Teflon insulation. The five static or corona dischargers are commonly connected to one terminal of a zero-center micrometer 44. The other terminal is connected to the frame of the aircraft 45. The discharger array is positioned in the most sensitive regions of the aircraft to rapidly respond to electrostatic charge acquired by the airframe.

In practice, meter 44 is located in a region of the cockpit so that it can be easily seen by the pilots peripheral vision. With the spray valve on and nozzles spraying, applying voltage from either (+) or (−) power supply will bring about a rapid deflection of the indicator 44. If the other power supply voltage is similarly elevated, the indicated corona current on meter 44 decreases, while forcing it to become zero. This routine establishes a spray charge flow balance. Specifically, (−)Q/M=(+)Q/M.

The first and second nozzle sets may be arranged to allow for spraying agrichemical chemicals in two different modes of operation, referred to herein as the bi-polar spraying mode and the coalescence mode. As noted hereinabove, the nozzle sets are substantially identical, preferably having equal numbers of identical nozzles. The selection of the optimal mode will depend upon several factors such as environmental factors, the physical characteristics of the spray formulation, the target plant and/or target pest. Generally, operation in the bi-polar spraying mode is particularly preferred where greater canopy penetration and under-leaf (wrap-around) deposition is desired, while coalescence mode spraying is particularly preferred when drift reduction is a primary concern.

Figure 5:
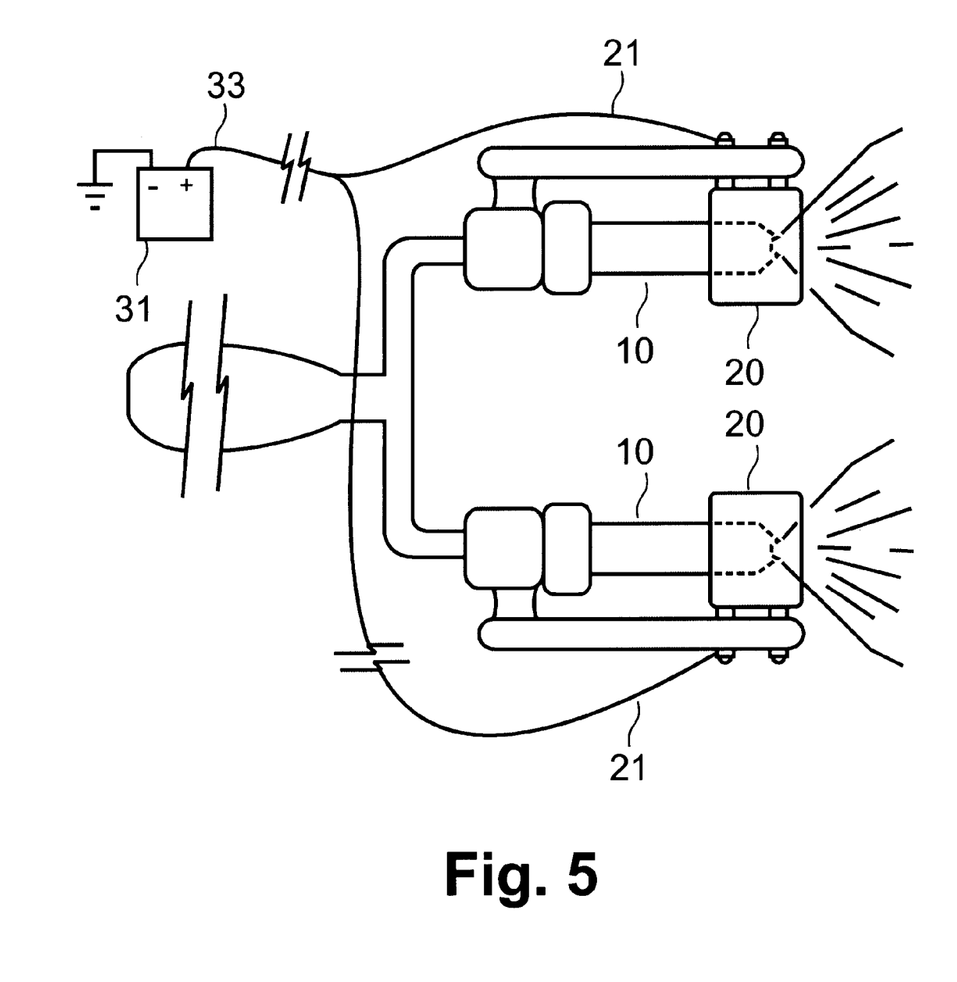
FIG. 5 is side view of a first preferred arrangement of the aerial spray charging nozzles of FIG. 1.
Figure 6:
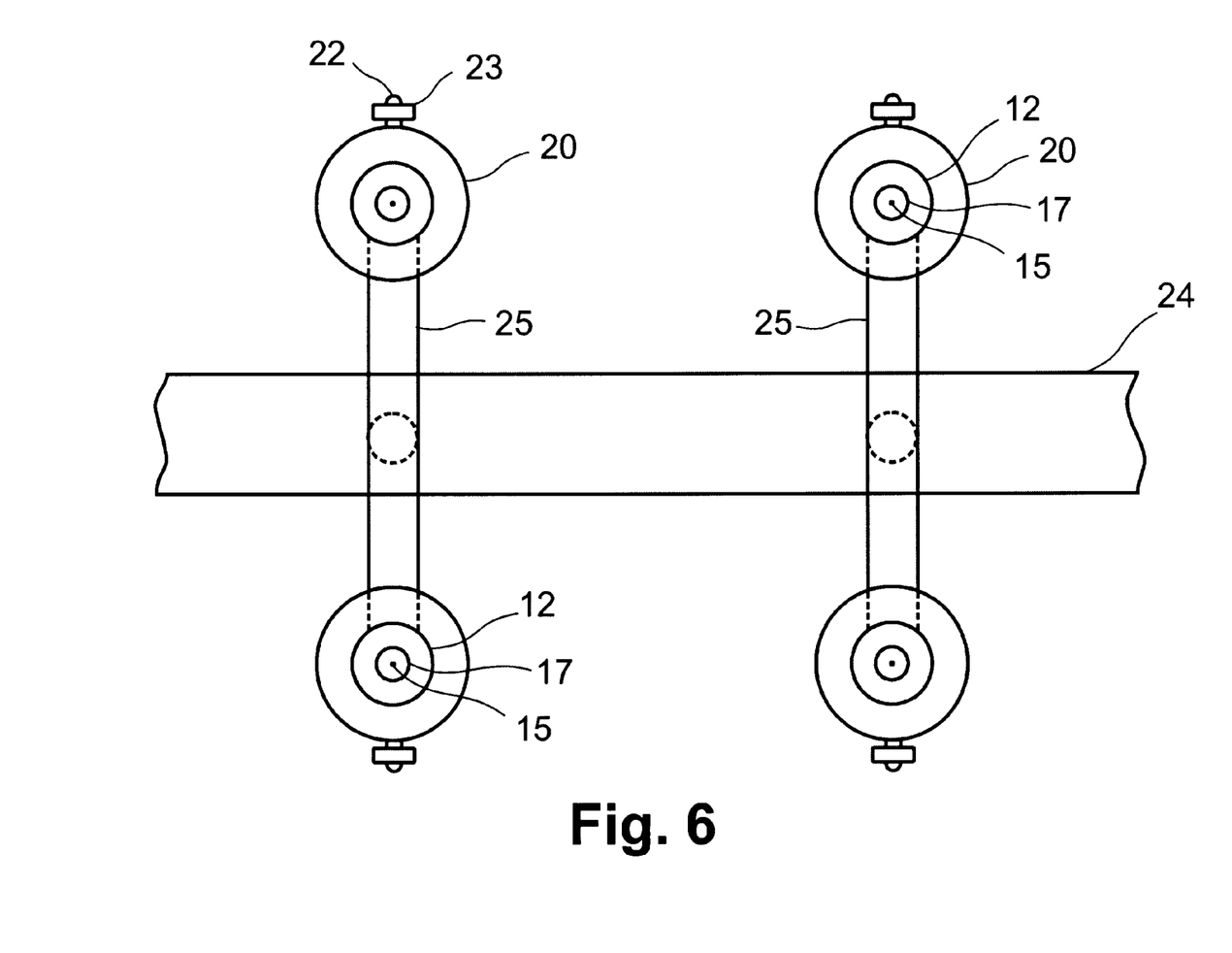
FIG. 6 is an end view of the arrangement shown in FIG. 5.

In accordance with the bi-polar spraying mode, the nozzles of the first and second nozzle sets are positioned on opposite sides of the aircraft; all of the nozzles of the first nozzle set being mounted along one boom, while the nozzles of the second nozzle set are mounted on the other boom. FIGS. 5 and 6 illustrate the arrangement of one of the nozzle sets on a boom for use in this mode. The other nozzle set will be similarly connected on the other boom but using of the opposite polarity power supply.

In contrast to the arrangement of the nozzle sets for bi-polar mode spraying, in the coalescence mode, the nozzles of each nozzle set are distributed on both sides of the aircraft. Moreover, each nozzle of the first nozzle set is paired with or positioned adjacent to a nozzle of the second nozzle set. In this mode of operation, the spray droplets issuing from the paired nozzles, being of opposite charge, will be attracted to each other and will combine or coalesce in flight. This coalescence results in an increase in the mass of the droplets which are less susceptible to drifting. The operational protocol to achieve spray drift reduction in the coalescence mode is otherwise identical to that used for the bipolar electrostatic charging mode.

Figure 7:
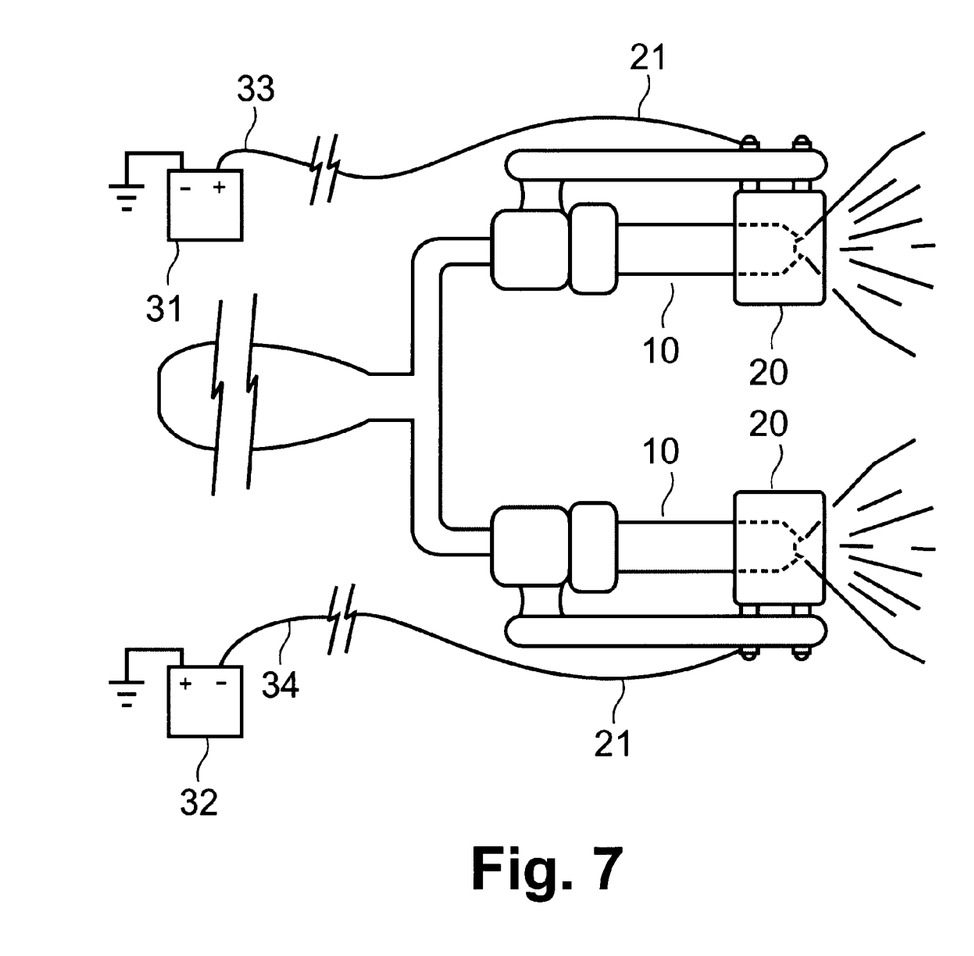
FIG. 7 is a side view of a second preferred arrangement of the aerial spray charging nozzles of FIG. 1.

Without being limited thereto, an example of the arrangement of the nozzles on one boom in the coalescence mode is shown in FIG. 7. The same nozzles and spray system described in the bi-polar mode are used with minor changes. Each spray boom 24 should be equipped with substantially the same number of nozzles 10. Each boom 24 is also equipped with a second buss or high voltage distribution bar, and the high voltage leads 33 and 34 from the (+) and (−) power supplies 31 and 32, respectively, are connected to the two buss bars. Electrical high voltage connections are made to each nozzle by making alternate nozzles on a boom the same polarity. Specifically, the nozzle electrodes along the booms will have a (+), (−), (+), (−), . . . (+), (−) polarity sequence, with the electrodes of each nozzle pair being of opposite polarity. Both booms are duplicated in the same manner. The spacing between both nozzles in the pair is preferably between about 4 to 8 inches, particularly about 6 inches (center to center) and maintained substantially the same for all nozzle pairs.

To demonstrate the effectiveness of aerial spraying in the coalescence mode, aerial spray deposition from spraying in the coalescence mode was compared with spraying without voltage application (no charging). As shown in Table 1, coalescence spraying greatly increased drop size by 33%, while reducing the drift-prone volume from 55 to 29%, and nearly doubling (0.01690/0.00874=1.94) the volume of spray depositing.

The practical application of apparatus and method of this invention for spraying a particular agricultural chemical of interest may require modification of its formulation's physical properties in order to appropriately modify the electrical resistivity. Agricultural crop pest control chemicals have a wide array of physical/chemical properties. Unfortunately, from the standpoint of the electrostatic spray charging process, those parameters conducive to aiding the charging process are often secondary in the chemical formulation process. If chemicals are to be electrostatically charged, they must be both sprayable and simultaneously chargeable. Specifically, they must have a viscosity and/or surface tension level that will permit proper atomization, and have a sufficient level of electrical resistivity so that they can simultaneously be electrostatically charged.

Before spraying any candidate chemical, the formulation should be tested to determine if the prepared (label) formulation is both sprayable (forms a sufficiently atomized, and consistent plume) and is inductively chargeable with the nozzle that will be used on the spray aircraft. Of foremost importance, the achievable charge to mass (Q/M) ratio must be determined. If this level is not greater than or equal to about 0.8 mC/kg, then electrostatic charging cannot be expected to enhance spray deposition, and the electrical resistivity of the formulation should be adjusted to improve this parameter. The resistivity may be adjusted using known techniques, such as by the addition or elimination of water, or the use or addition of a different solvent.

The droplet size should also be selected to maximize the charge to mass ratio of the spray and minimize drift potential. For proper charging, the droplet size of the spray should also be small, as an increase in the droplet size decreases the attainable Q/M ratio. However, the droplet size should not be so small as to substantially increase susceptibility to drift. Sprayability and droplet size may also be adjusted using known techniques, such as by addition of appropriate thinners, thickeners, or wetting agents to adjust viscosity and/or surface tension, or by use of different solvents.

Figure 8:
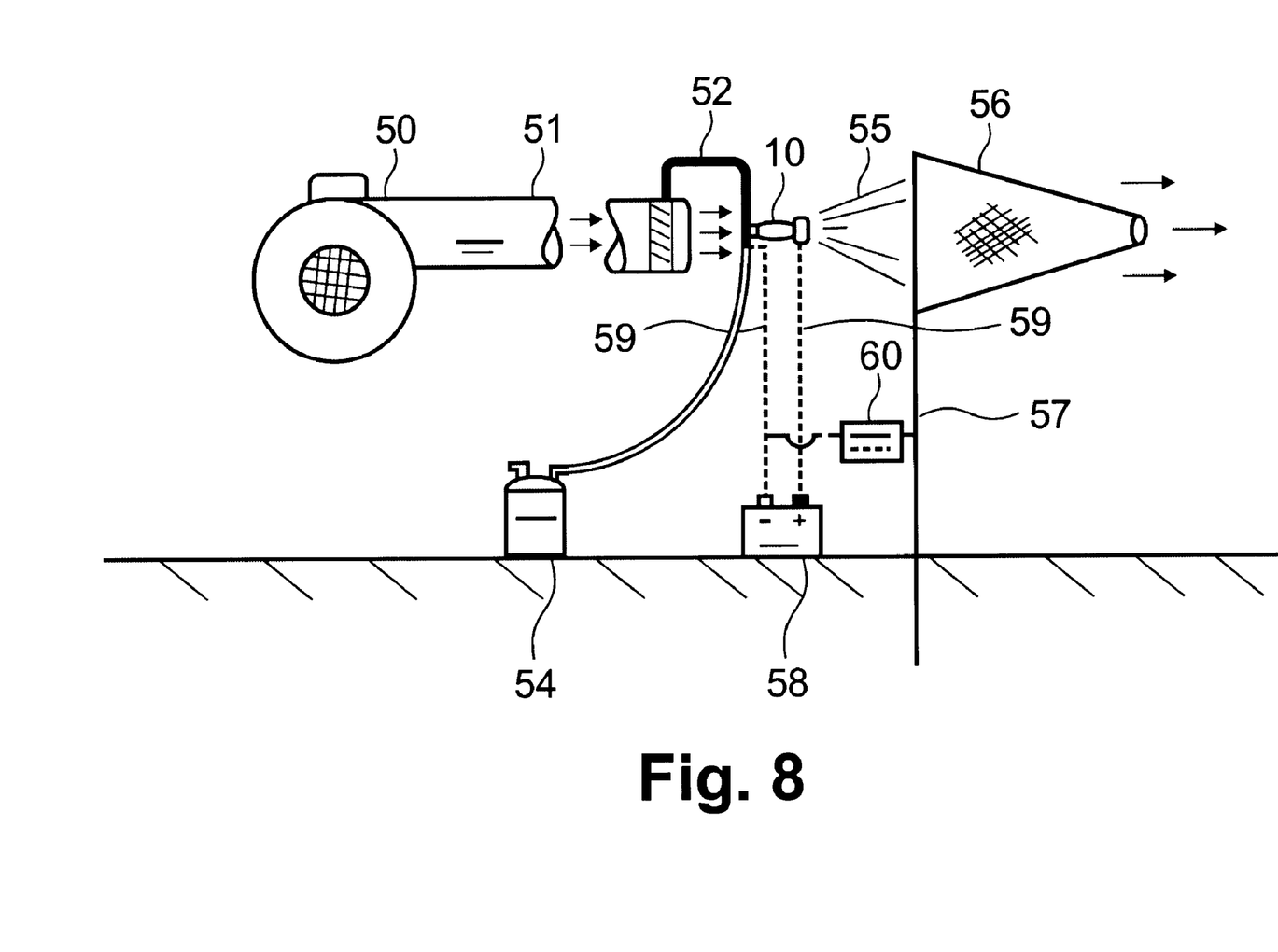
FIG. 8 shows a test facility for obtaining the sprayability/chargability characteristics of a test formulation using the nozzle of FIG. 1.

An apparatus for testing the sprayability and chargability of a spray formulation is shown in FIG. 8. This same apparatus can also be used to assist in the design and optimization of a nozzle 10 to achieve a maximum Q/M ratio. The facility requires a high velocity air blower 50 such as a fan or conventional leaf blower, capable of supplying variable air speeds up to about 150 MPH mimicking the air flow past the aircraft. Duct 51 releases the high-velocity air close to the spray nozzle 10 supported by rigid bar 52. The nozzle plumbing is equipped with variable pneumatic pressure for forcing the spray formulation out of a small reservoir 54. This pressure forms a spray plume 55 which is finely atomized by the high-velocity air from the blower. The spray enters a cone shaped cage/air spray scrubber 56 and exhausts through the 25-mesh wire. The scrubber is rigidly supported by means of a metal rod 57. Electrically, the charging nozzle 10 operates substantially as described above except that the electric power system 58 is powered by means of a dc battery. Variable dc spray charging voltages are supplied to the charging electrode by conductors 59. By sufficiently elevating the voltage on the induction charging electrode 20 (FIG. 1), spray charge is transported away from the nozzle. The spray is subsequently discharged as it makes contact with the walls of the cage/scrubber 56. This charge (spray current) then flows through a micrometer 60 back to the high-voltage ground.

In use of the test apparatus, the nozzle, spray pressure, formulation, and air velocity (same as intended aircraft application flight speed) are initially selected. Tests are then run with these parameters fixed. The charging voltage is elevated on the nozzle electrode typically in increments of 1 kV, and the corresponding spray current is recorded. This process is continued until further increases in charging voltage cause a reduction in spray current. When this occurs, the test is terminated.

The data obtained from a sample of typical runs is given in Table 2. The spray current and spray mass flow rate are converted into Q/M (mC/kg). From this table, it can be seen that with the given set of parameters used, the maximum Q/M ratio achievable for the endosulfan pesticide mix was 2.07 mC/kg and it was achieved at a charging voltage of (+)12 kV.

The preferred protocol for aerial spraying using the device of this invention is described below. Once the charging characteristics of the spray formulation have been obtained, this data are used for optimizing the efficiency of the aerial spraying. Generally, the aerial spray applicator should select the charging voltage providing a minimum Q/M ratio greater than about 0.8 mC/kg, most preferably the charging voltage corresponding to the maximum Q/M ratio. This charging voltage is then preset on one of the power supplies by the pilot. After the aircraft is airborne, a spray test run may be made, and the power supply previously set is energized. The zero-center corona meter should show a deflection indicating a charge flow from the aircraft surface. This is corona current induced by the spray charging process and is not interpreted as total spray current. The other power supply is then turned on and its charging voltage elevated. This voltage should be continually increased until the corona current dial indicator shows a reading of zero. The system is now balanced and ready for the standard spray application. The pilot should occasionally observe this meter during the spraying operation to insure no corona current (zero deflection) is flowing. Typically, readjustment is not necessary unless the nozzles become plugged by foreign material.

Although the apparatus of this invention has been described for use in conjunction with an aircraft, in an alternative embodiment, the apparatus may be adapted for ground application. For example, rather than arranging the nozzles on booms depending from an aircraft, the nozzles may be positioned on the downwind side of conventional high velocity/volume fans used for ground spraying. In this alternative embodiment, the fan merely replaces the aircraft as the source of the high velocity air passing along the nozzles 10. The disposition or arrangement of the nozzles on booms 24, and the electrical supplies may be substantially as described above.

It is understood that the foregoing detailed description is given merely by way of illustration and that modifications and variations may be made therein without departing from the spirit and scope of the invention.

TABLE 1

Measured aerial spray deposition parameter means from electric field induced spray drop coalescence.

| Parameter Measured | With Charge | Without Charge |
|---|---|---|
| Volume Median Drop Diameter | 112 μm | 84 μm |
| Spray Volume < 100 μm dia. | 29% | 55% |
| Spray volume collected (per collector) | 0.01690 μl | 0.00874 μl |

TABLE 2

Test data obtained from the procedure to determine the sprayability/chargability of two sprayed liquids.

| Spray Solution | | | | | |
|---|---|---|---|---|---|
| Water | | | Endosulflan and Water | | |
| (+)kV | Spray current | O/M | (+)kV | Spray current | O/M |
| 1 | 1.4 μA | 0.30 | 1 | 1.4 μA | 0.28 |
| 2 | 1.7 μA | 0.36 | 2 | 2.0 μA | 0.40 |
| 3 | 2.4 μA | 0.51 | 3 | 2.7 μA | 0.54 |
| 4 | 3.3 μA | 0.70 | 4 | 3.7 μA | 0.74 |
| 5 | 4.0 μA | 0.85 | 5 | 4.6 μA | 0.92 |
| 6 | 4.9 μA | 1.04 | 6 | 5.8 μA | 1.16 |
| 7 | 5.5 μA | 1.17 | 7 | 6.5 μA | 1.29 |
| 8 | 6.3 μA | 1.33 | 8 | 7.5 μA | 1.49 |
| 9 | 7.1 μA | 1.50 | 9 | 8.5 μA | 1.69 |
| 10 | 7.5 μA | 1.59 | 10 | 9.3 μA | 1.85 |
| 11 | 8.0 μA | 1.69 | 11 | 10.0 μA | 1.99 |
| 12 | 1.5 μA | 0.32 | 12 | 10.4 μA | 2.07 |
| | | | 13 | 9.0 μA | 1.79 |

I claim:

1. An apparatus for spraying electrostatically charged liquid comprising:

a. a first nozzle set comprising one or more nozzles having a nozzle tip effective for producing a hollow cone spray pattern and wherein at least said nozzle tip is constructed from a substantially non-conducting material, said first nozzle set further comprising a cylindrical charging electrode positioned adjacent and concentric to the outlet of said nozzle tip of each of said nozzles effective to induce an electrostatic charge upon liquid sprayed from said nozzle, said electrode being spaced apart from said nozzle tip a sufficient distance to allow laminar airflow therebetween effective for shearing and atomizing the liquid spray exiting said nozzle tip;

b. a second nozzle set comprising one or more nozzles having a nozzle tip effective for producing a hollow cone spray pattern and wherein at least said nozzle tip is constructed from a substantially non-conducting material, said second nozzle set further comprising a cylindrical charging electrode positioned adjacent and concentric to the outlet of said nozzle tip of each of said nozzles effective to induce an electrostatic charge upon liquid sprayed from said nozzles, said electrode being spaced apart from the nozzle tip a sufficient distance to allow laminar airflow therebetween effective for shearing and atomizing the liquid spray exiting said nozzle tip;

c. a liquid supply conduit in communication with each of the nozzles of said first nozzle set and said second nozzle set;

d. a first high voltage power supply having positive and negative poles, wherein one of said positive or negative poles is connected to each electrode of said first nozzle set, and the remaining pole is adapted to be grounded;

e. a second high voltage power supply having positive and negative poles, wherein one of said positive or negative poles is connected to each electrode of said second nozzle set, said pole connected to said electrodes of said second nozzle set being of the opposite polarity than the pole connected to said electrodes of said first nozzle set, and the remaining pole of said second high voltage power supply is adapted to be grounded.

2. The apparatus of claim 1 wherein said electrodes and said nozzle tips of said nozzles of both said first nozzle set and said second nozzle set are positioned a sufficient distance apart that said electrode is not contacted by said hollow cone spray pattern.

3. The apparatus of claim 2 wherein the axial distance between the downwind end of said electrode and the outlet of said nozzle tip is between about 0.250 to 0.600 inches.

4. The apparatus of claim 1 wherein the number of nozzles of said first nozzle set is the same as the number of nozzles of said second nozzle set.

5. The apparatus of claim 1 wherein each nozzle of said first nozzle set is arrayed in a pair with one of said nozzles of said second nozzle set, the nozzles of each said pair being spaced from one another a distance effective to achieve airborne coalescence of the liquid sprayed from the nozzles of each said pair.

6. The apparatus of claim 5 wherein the distance between the center of the nozzle tips of the nozzles of each said pair is between about 4 to 8 inches.

7. The apparatus of claim 1 wherein said first nozzle set and said second nozzle set are positioned on opposite sides of an aircraft.

8. The apparatus of claim 1 further comprising at least one boom to which said first nozzle set and said second nozzle set are attached, said boom being adapted for attachment to an aircraft.

9. The apparatus of claim 1 wherein the voltage output from said first high voltage power supply and said second high voltage power supply is adjustable.

10. A method for electrostatically spraying a liquid formulation of an agricultural chemical from an aircraft comprising:

a. providing the apparatus of claim 1 on an aircraft;

b. adjusting the charging voltage of said first high voltage power supply and said second high voltage power supply to a level effective to provide a charge to mass ratio of the liquid formulation for spraying of greater than or equal to about 0.8 mC/kg;

c. energizing said first high voltage power supply and said second high voltage power supply to apply said charging voltage to the electrodes of said first nozzle set and said second nozzle set; and d. aerially spraying said liquid formulation from said first nozzle set and said second nozzle set concurrently.

11. The method of claim 10 further comprising:

e. Monitoring the airframe corona emission of said aircraft and further adjusting the charging voltage of one or both of said first high voltage power supply or said second high voltage power supply until the airframe corona discharge is substantially zero.

12. The method of claim 11 wherein both the mass and the charge to mass ratio of said liquid sprayed from said first nozzle set and said second nozzle set are equal.

* * * * *